United States Patent
Theel et al.

(10) Patent No.: US 9,862,385 B2
(45) Date of Patent: Jan. 9, 2018

(54) METHOD OF OPERATING A DRIVE DEVICE FOR A MOTOR VEHICLE, AND CORRESPONDING DRIVE DEVICE

(71) Applicant: Audi AG, Ingolstadt (DE)

(72) Inventors: Thomas Theel, Oberhausen (DE); Andras Eppel, Ingolstadt (DE); Jörg Au, Bischoffen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/390,171

(22) Filed: Dec. 23, 2016

(65) Prior Publication Data
US 2017/0183011 A1 Jun. 29, 2017

(30) Foreign Application Priority Data
Dec. 24, 2015 (DE) .......... 10 2015 016 969

(51) Int. Cl.
*B60W 10/02* (2006.01)
*B60W 10/06* (2006.01)
*B60W 30/18* (2012.01)

(52) U.S. Cl.
CPC ...... *B60W 30/18072* (2013.01); *B60W 10/02* (2013.01); *B60W 10/06* (2013.01); *B60W 2030/18081* (2013.01); *B60W 2520/26* (2013.01)

(58) Field of Classification Search
CPC ............ B60W 10/02; B60W 10/06; B60W 30/18018; B60W 30/18072; B60W 2030/18081; B60W 2520/26; B60W 2710/021; B60W 2710/025
See application file for complete search history.

(56) References Cited

U.S. PATENT DOCUMENTS

| | | | | |
|---|---|---|---|---|
| 5,626,536 A | * | 5/1997 | Kono ............ | B60W 10/06 192/3.3 |
| 6,041,276 A | | 3/2000 | John et al. | |
| 2010/0222973 A1 | * | 9/2010 | Senda ............ | B60W 10/02 701/54 |
| 2015/0149010 A1 | * | 5/2015 | Matsui ............ | B60K 6/48 701/22 |

FOREIGN PATENT DOCUMENTS

| | | |
|---|---|---|
| DE | 195 13 516 | 10/1996 |
| DE | 196 53 855 | 4/1998 |
| DE | 102011018887 | 10/2012 |
| DE | 102012022460 | 5/2014 |
| DE | 102013205010 | 9/2014 |

* cited by examiner

*Primary Examiner* — Edwin A Young
(74) *Attorney, Agent, or Firm* — Henry M. Feiereisen LLC

(57) ABSTRACT

In a method of operating a drive device for a motor vehicle, a clutch is at least partly engaged, while an internal combustion engine of the drive device is inactive during coasting of the motor vehicle and the clutch is disengaged, to crank and thereby start the internal combustion engine with a clutch torque applied to the clutch. The clutch torque is hereby determined from a default wheel slip value which is based on a motor vehicle parameter.

21 Claims, 1 Drawing Sheet

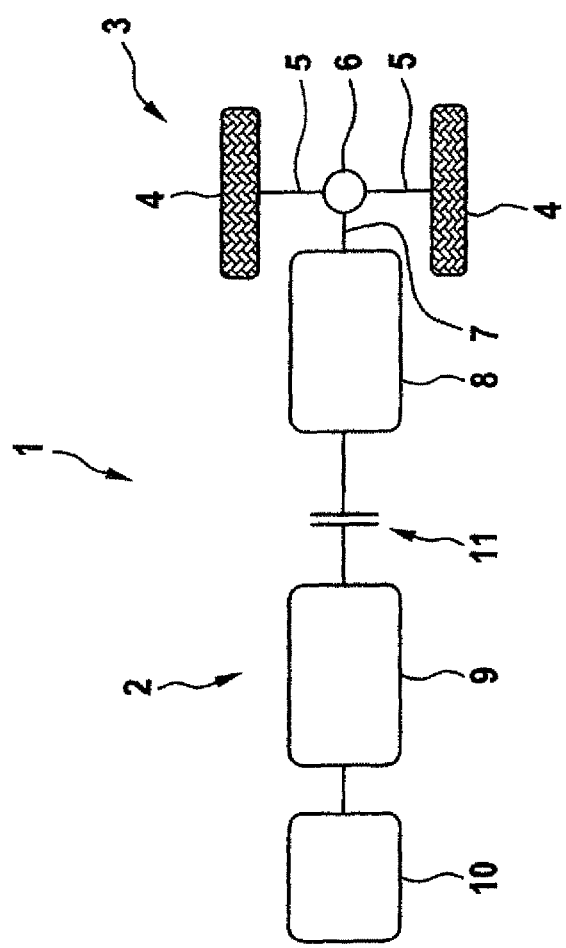

METHOD OF OPERATING A DRIVE DEVICE FOR A MOTOR VEHICLE, AND CORRESPONDING DRIVE DEVICE

CROSS-REFERENCES TO RELATED APPLICATIONS

This application claims the priority of German Patent Application, Serial No. 10 2015 016 969.6, filed Dec. 24, 2015, pursuant to 35 U.S.C. 119(a)-(d), the disclosure(s) of which is/are incorporated herein by reference in its entirety as if fully set forth herein.

BACKGROUND OF THE INVENTION

The present invention relates to a method of operating a drive device for a motor vehicle, and corresponding drive device.

The following discussion of related art is provided to assist the reader in understanding the advantages of the invention, and is not to be construed as an admission that this related art is prior art to this invention.

The drive device serves to power the motor vehicle, i.e. to provide an appropriate level of torque to power the motor vehicle. The drive device includes an internal combustion engine by which the necessary torque either by itself or together with at least one further drive unit is produced. The internal combustion engine can be operatively connected with at least one of the wheels of the motor vehicle, especially with a wheel axle of the motor vehicle. This is the function of the clutch.

The term "clutch" is to be understood as relating to any element having at least two states, whereby in one of the states there is an operative connection between the internal combustion engine and the wheel of the vehicle and in the other state the internal combustion engine and the wheel are disconnected from each other. In other words, the clutch is a releasable clutch, particularly a releasable frictional clutch. The clutch can, for example, be a starting element, such as an starting clutch, a clutch torque converter, in particular a hydrodynamic clutch torque converter, or the like.

When the clutch is disengaged, the operative connection between the internal combustion engine and the wheel is severed. However, when the clutch is at least partially engaged, torque from the internal combustion engine is transmitted to the wheel. When the clutch is fully engaged, the operative connection between the internal combustion engine and the wheel is rigid or substantially rigid. When the clutch is fully engaged, there is ideally no clutch slip between the internal combustion engine and the wheel.

In order to start the internal combustion engine, it is necessary to crank it to a minimum starting speed. This is realized by an electrical machine which, for example, is configured as a starter or as a starter generator. The electric machine can be permanently operatively connected to the internal combustion engine, particularly by a freewheel or overrunning clutch, so that torque supplied by the electric machine is applied to the internal combustion engine to start it, However, cranking of the running internal combustion engine does not carry along the electric machine.

It would be desirable and advantageous to provide an improved method of operating a drive device for a motor vehicle to obviate prior art shortcomings and to realize an efficient and fuel-saving operation of the drive device or internal combustion engine.

SUMMARY OF THE INVENTION

According to one aspect of the present invention, a method of operating a drive device for a motor vehicle includes, while an internal combustion engine of the drive device is inactive during coasting of the motor vehicle and a clutch is disengaged, at least partly engaging the clutch to crank and thereby the internal combustion engine with a clutch torque applied to the clutch, and determining the clutch torque from a default wheel slip value which is based on a motor vehicle parameter.

When coasting, the speed of the motor vehicle is different from zero, for example because of the influence of gravity on the motor vehicle to propel the motor vehicle. Because in this instance the propulsion of the motor vehicle is accomplished by the force of gravity, it can be useful to shut the internal combustion engine down, thereby rendering it inactive, i.e. the internal combustion engine has a rotation speed of zero. Thus, no fuel is required to maintain rotation of the internal combustion engine while idling, so that operation of the motor vehicle can be carried out in a fuel-saving and energy-efficient manner.

While the vehicle is coasting, the internal combustion engine is thus advantageously inactive, whereas the clutch is disengaged at the same time, particularly fully disengaged. The clutch is thus adjusted such that while the motor vehicle is coasting, the Internal combustion engine is not cranked by the rotating wheel of the motor vehicle.

When the motor vehicle stops coasting and begins normal operation in which the internal combustion engine runs i.e. at a speed which equals at least an idling speed of the internal combustion engine, the inactive internal combustion engine must be started while the motor vehicle is coasting. This is implemented when switching the motor vehicle from coasting mode to normal operation. The internal combustion engine can be started, for example, by the electric machine. This requires consumption of energy which may, for example, be drawn from an energy accumulator.

To avoid this energy consumption and to start the internal combustion engine in an energy-efficient manner, the present invention contemplates to use the clutch between the wheel of the motor vehicle and the internal combustion engine. More specifically, the clutch should now be engaged, at least in part, so as to transmit the set clutch torque via the clutch to the internal combustion engine. Starting the Internal combustion engine in this way eliminates the need to use the electric machine to start the internal combustion engine. To crank the inactive internal combustion engine, it is necessary to apply a drag torque, generated by the internal combustion engine, upon the internal combustion engine. It is therefore advantageous when the clutch torque applied to the clutch corresponds at least to or is greater than the drag torque.

When the clutch is engaged so that clutch torque is transmitted to the internal combustion engine but also with reversed sign upon the wheel of the motor vehicle, the normal operation of the motor vehicle can be inadvertently affected, especially when the wheel travels on a ground with a low coefficient of friction and/or when the motor vehicle negotiates a curve. For this reason, provision is made for the clutch torque to be variable, i.e. not set fixed equal to the drag torque or to engage the clutch beyond the drag torque or even to fully engage the clutch.

The clutch torque applied to the clutch is advantageously determined in accordance with the default wheel slip value. The default wheel slip value corresponds to a maximum wheel slippage that is permitted in accordance with the motor vehicle parameter. For example, the default wheel slip value is smaller during cornering of the motor vehicle, compared to a situation when the motor vehicle travels in a straight line. The motor vehicle parameter is initially determined, advantageously in accordance with a current driving state of the motor vehicle. In the description, when referring to wheel slippage or an equivalent variable, such as, for example, the default wheel slip value, an actual wheel slip value and/or wheel slippage of one or more wheels, the actual value or, advantageously the sign-adjusted value, i.e. the absolute value, is related to.

According to another advantageous feature of the present invention, the default wheel slip value can be selected from a plurality of predetermined stored default wheel slip values as a function of a motor vehicle parameter. Alternatively, the default wheel slip value can also be determined directly from the motor vehicle parameter. This can be realized using mathematical calculation, using an internal combustion engine map, or using a table. The clutch torque can then be determined on the basis of the selected default wheel slip value. This may also be realized using mathematical calculation, using an internal combustion engine map, or using a table. For example, the clutch torque may be proportional to the default wheel slip value. The clutch torque determined from the default wheel slip value is dimensioned in such a way that the actual wheel slip value existing at the wheel of the motor vehicle is less than the default wheel slip value under the usual boundary conditions or environmental conditions. It is, therefore, not necessary that an actual wheel slip value be used to determine the clutch torque transmitted to the internal combustion engine; but this may be an option.

After determination of the clutch torque from the default wheel slip value, the clutch torque is applied to the clutch, so that torque from the wheel of the motor vehicle is transmitted to the internal combustion engine. Advantageously, the clutch torque is applied to the clutch only when adequate to start the internal combustion engine, i.e. at least equals the drag torque of the internal combustion engine. When the transmitted clutch torque is less than the drag torque, the clutch can be disengaged, especially fully disengaged, so as to decouple the motor vehicle wheel from the internal combustion engine. This prevents clutch slip of the clutch, when the travel state of the motor vehicle is such that the torque, produced by the wheels and transmitted to the internal combustion engine via the clutch, is anyway insufficient to start the internal combustion engine.

The described mode of operation of the drive device has the advantage that in most instances, efficient starting of the internal combustion engine can be realized while an adverse effect on the driving safety, caused for example by excessive slippage at the wheel or wheels, can be reliably avoided.

According to another advantageous feature of the present invention, an actual wheel slip value can be additionally considered, when determining the clutch torque applied to the clutch, and the actual wheel slip value can be determined as a function of the measured and/or estimated wheel slippage of at least one motor vehicle wheel which is operably connected to the internal combustion engine. The actual wheel slip value corresponds at least substantially to the actual wheel slippage of the wheel of the motor vehicle. The actual wheel slip value can generally be determined in any suitable manner. Currently preferred is a measurement of the actual wheel slip value. As an alternative, it is also possible to calculate it or to estimate it.

The actual wheel slip value can thus be used together with the default wheel slip value to determine the clutch torque applied to the clutch. The clutch torque is therefore a function of at least the default wheel slip value and the actual wheel slip value. In this way, the clutch torque can be reliably limited to a value, which maintains driving safety of the motor vehicle in any situation.

According to another advantageous feature of the present invention, the default wheel slip value can be an absolute value, a relative value with respect to an initial value, or a differential value. The default wheel slip value is a (theoretical) limit value for an actual wheel slip value and can be defined in any manner. For example, with the assistance of the default wheel slip value, the actual wheel slip value can be limited to the absolute value.

The default wheel slip value can also be used to limit the actual wheel slip value with respect to the initial value. For this purpose, the default wheel slip value can be defined as a relative value, so that the clutch torque is determined such that an increase of the actual wheel slip value from the initial value can be prevented by using the relative value. The initial value may, for example, be the actual wheel slip value at the time the motor vehicle ceases to coast and begins normal operation. This actual wheel slip value can be measured or estimated.

The differential value describes the first derivative of the wheel slippage with respect to time, i.e. the rate at which the wheel slippage changes. By appropriate selection of the default wheel slip value, the rate of change and particularly the rate of increase of the actual wheel slip value can be limited upwards, so that the increase of the actual wheel slip value is kept smaller at all times than the differential value.

According to another advantageous feature of the present invention, the actual wheel slip value can be determined by a wheel slippage of more than one wheel, e.g. through weighted averaging, differentiation, summation, or ratio calculation. The actual wheel slip value thus does not only describe the slippage of merely one wheel, but rather the slippage of several wheels of the motor vehicle, e.g. several wheels on one wheel axle of the motor vehicle or also wheels on different wheel axles. Currently preferred is a determination of the actual wheel slip value based on the wheel slippage of all wheels of the motor vehicle.

To determine the actual wheel slip value, values for the wheel slippage of the wheels are initially determined, e.g. measured and/or estimated. These values enter the actual wheel slip value, e.g. through weighted averaging, differentiation, summation, or ratio calculation. Other processes, such as transformation, integration or the like are, of course, also possible.

According to another advantageous feature of the present invention, the wheel slippage can be determined while a non-zero clutch torque is transmitted via the clutch. Especially when the clutch is engaged while the motor vehicle transitions from coasting to normal operation and the wheel or wheels are on a ground with low coefficient of friction, the clutch torque applied to the wheel or wheels causes a reaction, e.g. a skidding of the at least one wheel or wheels and/or a torque difference between the wheel and at least one further wheel, so that the wheel rotates faster or slower than the at least one further wheel. This reaction can be easily determined so that the wheel slippage, particularly the actual wheel slip value, can be determined with precision, while the clutch is at least partially engaged, i.e. a non-zero clutch torque is transmitted from the wheels to the internal combustion engine.

According to another advantageous feature of the present invention, the clutch torque can be reduced, when the actual wheel slip value is greater than the default wheel slip value. As described above, by selecting an appropriate clutch torque, the actual wheel slip value can be prevented from exceeding the default wheel slip value. When this situation does occur, the clutch torque is reduced, and particularly reduced sufficiently so that the actual wheel slip value drops again below the default wheel slip value.

According to another advantageous feature of the present invention, the actual wheel slip value can be controlled through open-loop control or closed-loop control by matching the clutch torque to the default wheel slip value or by adjusting the clutch torque to approach the default wheel slip value. The difference between the default wheel slip value and the actual wheel slip value serves, for example, as control variable whereas the clutch torque represents the controlled variable. Control of the clutch torque can be accomplished by any type of controller. Currently preferred is the provision of a controller which includes a proportional controlling element, integrating controlling element, and/or a differentiating controlling element.

Advantageously the rapidity with which the clutch torque can be adapted increases as the difference between the default wheel slip value and the actual wheel slip value increases. By matching the clutch torque, the actual wheel slip value is changed, advantageously approaching the default wheel slip value. Control of the clutch torque is advantageously implemented until the actual wheel slip value is equal to or less than the default wheel slip value. It is also possible in this case to fully disengage the clutch, when the clutch torque to be set is less than the drag torque of the internal combustion engine, since in this situation the internal combustion engine cannot be started anyway.

Advantageously, the drag torque can be determined as a function of a rotational speed of the internal combustion engine. The drag torque normally decreases as the rotational speed of the internal combustion engine increases. When the internal combustion engine has already started to crank as a result of at least a partial engagement of the clutch, i.e. brought to a non-zero rotational speed, only a reduced drag torque is required to ultimately bring the internal combustion engine to an adequate rotational speed at which it will start.

When, for example, the clutch torque drops during startup of the internal combustion engine below the drag torque so that as a result starting of the internal combustion engine is terminated or interrupted, there may be the case that during a renewed starting of the internal combustion engine shortly thereafter the rotational speed of the internal combustion engine is still non-zero. In such a case, starting the internal combustion engine is possible with reduced drag torque.

According to another advantageous feature of the present invention, the motor vehicle parameter can be an actual yaw rate of the motor vehicle, a target yaw rate, a yaw rate differential between the actual yaw rate and the target yaw rate, a roll velocity, an acceleration, e.g. longitudinal acceleration or transverse acceleration, a steering angle, or a trailer coupling state. In general, the motor vehicle parameter may be randomly selected. Currently preferred is, however, to determine the default wheel slip value as a function of at least one of the afore-mentioned variables, advantageously as a function of a plurality of them, or as a function of all of them.

The actual yaw rate describes the actual rotational speed of the internal combustion engine of the motor vehicle about its vertical axis, whereas the target yaw rate describes a theoretically necessary yaw rate, especially when cornering. The target yaw rate can be determined, for example, on the basis of a steering angle of the motor vehicle and/or similar variables. The yaw rate differential thus describes the deviation between the theoretically necessary target yaw rate and the current actual yaw rate. Normally, the yaw rate differential equals zero or approximately equals zero. When the yaw rate differential is sufficiently different from zero as to exceed a limit value, inference can be made that the motor vehicle is in an unstable state. The greater the yaw rate differential, the lesser should be the default wheel slip value and, accordingly, the lesser should be the clutch torque.

In addition or as an alternative, the roll rate can be used as the motor vehicle parameter. The roll rate describes a rotation of the motor vehicle about its longitudinal axis. Also in this case, provision is normally made that the greater the roll rate is, the lesser the default wheel slip value is selected. When acceleration of the motor vehicle is used as the motor vehicle parameter, the default wheel slip value is selected, for example, progressively smaller as the acceleration increases. This is especially the case, when the acceleration involves a transverse acceleration. When the steering angle is used as the motor vehicle parameter, the default wheel slip value is progressively smaller as the steering angle becomes smaller. The trailer coupling state describes a condition of a trailer coupling on the motor vehicle and particularly identifies whether a trailer is coupled to the motor vehicle via the trailer coupling. When this is the case, the default wheel slip value is normally selected smaller compared to a situation when no trailer is coupled to the motor vehicle.

Other motor vehicle parameters may, of course, also be used, e.g. a windshield wiper signal, a temperature such as outside temperature, execution of a wheel brake testing signal, or the like. Provision may also be made to determine the default wheel slip value initially in accordance with the motor vehicle parameter and subsequently to adapt it as a function of at least one of the other motor vehicle parameters. The windshield wiper signal indicates, e.g., the mode of operation of a wiper system. Since the outside temperature can at least be an indicator about the road condition, the outside temperature may also be used to determine the default wheel slip value. For example, the default wheel slip value is selected progressively smaller as temperature, particularly the outside temperature, drops. A wheel brake test operation is, for example, used to determine the coefficient of friction of the ground or roadway which is traveled by the motor vehicle. The torque transmitted by the wheel onto the ground is changed, e.g. abruptly, and the reaction of the motor vehicle is determined.

According to another advantageous feature of the present invention, the starting of the Internal combustion engine by partly disengaging the clutch can be terminated, when the actual wheel slip value exceeds a maximum wheel slip value that exceeds the default wheel slip value. Advantageously, starting of the internal combustion engine can then be assumed by the electric machine, when the actual wheel slip value exceeds the maximum wheel slip value. The maximum wheel slip value can, for example, be a constant. Advantageously, like the default wheel slip value, the maximum wheel slip value can be determined as a function of at least one of the motor vehicle parameters, particularly as a function of a plurality of stored maximal wheel slip values.

Alternatively, the maximum wheel slip value may be set to have a fixed relationship to the default wheel slip value, so that the maximum wheel slip value is established from the default wheel slip value multiplied with a constant factor which is greater than one. When the actual wheel slip value exceeds the maximum wheel slip value, starting of the internal combustion engine as a result of the engagement of the clutch is terminated. As a consequence, the clutch is disengaged, particularly fully disengaged, so that the operative interaction between the internal combustion engine and the wheel is severed. Subsequent starting of the internal combustion engine can alternatively be implemented by using the electric machine to switch from coasting of the motor vehicle to normal operation of the internal combustion engine, in spite of the excessive actual wheel slip value.

According to another aspect of the present invention, a drive device for a motor vehicle includes an internal combustion engine, a clutch operatively connecting the internal combustion engine to at least one wheel, said clutch being configured such that, when the internal combustion engine is inactive during coasting of the motor vehicle and the clutch is disengaged, the internal combustion engine is cranked and thereby started through at least partial engagement of the clutch as a clutch torque is applied to the clutch, with the clutch torque being determined from a default wheel slip value which is based on a motor vehicle parameter, and an electric machine configured to start the internal combustion engine.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 is a schematic illustration of a chassis of a motor vehicle, having embodied therein the subject matter according to the present invention.

DETAILED DESCRIPTION OF PREFERRED EMBODIMENTS

The depicted embodiment is to be understood as illustrative of the invention and not as limiting in any way. It should also be understood that the FIGURE may not necessarily be to scale. In certain instances, details which are not necessary for an understanding of the present invention or which render other details difficult to perceive may have been omitted.

Turning now to FIG. 1, there is shown a schematic illustration of a chassis of a motor vehicle, generally designated by reference numeral 1 and having embodied therein the subject matter according to the present invention. The motor vehicle 1 includes a drive device 2 for providing a drive torque for at least a wheel axle 3, to which two wheels 4 are mounted in the exemplary embodiment shown here. The wheels 4 are each operably connected via axle shafts 5 to a differential gear 6, e.g. an axle differential gear. The axle shafts 5 thus represent output shafts of the differential gear 6. An input shaft 7 of the differential gear 6 is connected to a transmission 8 by which different gear ratios between the drive device 2 and the differential gear 6 or its input shaft 7 can be adjusted.

Although FIG. 1 depicts only a single wheel axle and two wheels 4, it will be appreciated by persons skilled in the art that the drive device 2 contains additional components, such as more wheels, more wheel axles, etc., which have been omitted from FIG. 1 for the sake of simplicity.

The drive device 2 includes an internal combustion engine 9 and an electric machine 10. The electric machine 10 may be configured, e.g., as starter or starter generator, and is or can be operatively connected to the internal combustion engine 9 via a clutch (not shown). The internal combustion engine 9 is operably connectable to the transmission 8 and thus to the wheels 4 via a clutch 11 of the drive device 2. The wheels 4 thus represent wheels that can be driven or are driven or are wheels that are mounted to an axle that can be driven or is driven. As mentioned above, in addition to the wheels 4, provision may be made, of course, for at least one further wheel, especially additional wheels that are mounted to a further axle. These wheels may not be powered or the further axle may not be powered. As an alternative, the at least one further wheel may be operably connected to a drive unit, e.g. an electric machine.

When the internal combustion engine 9 is inactive, e.g. when the motor vehicle 1 is coasting, the clutch 11 is disengaged, in particular fully disengaged so that the interaction between the internal combustion engine 9 and the wheels 4 is completely cut off. In order to switch from coasting to normal operation, in which the internal combustion engine 9 runs, e.g. revolves at a rotational speed which corresponds at least to an idling speed, provision must be made to bring the internal combustion engine 9 from standstill to a specific rotational speed, The electric machine 10 may be used to start the internal combustion engine 9. This, however, is inefficient.

As an alternative, in accordance with the present invention, the clutch 11 can be engaged, at least in part, in order to transmit a clutch torque from the wheels 4 via the clutch 11 to the internal combustion engine 9. In this way, kinetic energy of the moving motor vehicle 1 provides the needed energy to start the internal combustion engine 9. As a result, there is no need to operate the electric machine 10 to provide the electric energy, e.g. from an energy accumulator of the motor vehicle 1, although it may be an option.

A clutch torque is thus applied to the clutch 11, when the clutch 11 is, at least partly, engaged to start the internal combustion engine 9. The clutch torque applied to the clutch 11 is determined by a default wheel slip value which, in turn, is selected as a function of at least one motor vehicle parameter from a plurality of stored default wheel slip values, or directly as a function of at least one motor vehicle parameter.

The default wheel slip value is used as a limit value for an actual wheel slip value that exists between at least one of the wheels 4 (or both of them) and a ground on which the motor vehicle 1 is traveling. The default wheel slip value varies, e.g., for different motor vehicle parameters. Examples of motor vehicle parameters include actual yaw rate of the motor vehicle 1, a target yaw rate, a yaw rate differential between the actual yaw rate and the target yaw rate, a roll rate, an acceleration, e.g. longitudinal acceleration or transverse acceleration, or a trailer coupling state. The default wheel slip value is used to then determine the clutch torque such as to ensure that the actual wheel slip value is less than the default wheel slip value.

This, however, may actually not be the case in a simple embodiment. Rather the correlation between the clutch torque and the default wheel slip value can be selected such as to ensure for normal driving conditions of the motor vehicle 1 and/or environmental conditions that the actual wheel slip value is less than the default wheel slip value, when the determined clutch torque is applied on the clutch 11. Thus, there may be a situation in which the actual wheel slip value exceeds the default wheel slip value in the presence of travel conditions or environmental conditions that deviate from normal conditions. Provision is therefore made to also take into account the actual wheel slip value in addition to the default wheel slip value, when determining the clutch torque. For example, the actual wheel slip value can be controlled by adjusting the clutch torque to equal the default wheel slip value or at least to come close enough to the default wheel slip value.

With the described configuration and operation of the drive device 2 of the motor vehicle 1, an energy-efficient start of the Internal combustion engine 9 can be achieved while ensuring a reliable driving operation of the motor vehicle 1. Driving operation is not adversely affected by the afore-described starting of the internal combustion engine 9, even when the wheels 4 of the motor vehicle 1 travel on a ground having low coefficient of friction.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method of operating a drive device for a motor vehicle, comprising:
    while an internal combustion engine of the drive device is inactive during coasting of the motor vehicle and a clutch is disengaged, at least partly engaging the clutch to crank and thereby start the internal combustion engine with a clutch torque applied to the clutch; and
    determining the clutch torque from a default wheel slip value which is based on a motor vehicle parameter.

2. The method of claim 1, wherein the default wheel slip value is selected from a plurality of predetermined stored default wheel slip values as a function of the motor vehicle parameter.

3. The method of claim 1, wherein the default wheel slip value is determined as a function of the motor vehicle parameter.

4. The method of claim 1, further comprising:
    measuring or estimating a wheel slippage of at least one wheel of the motor vehicle in operative connection with the internal combustion engine;
    additionally considering an actual wheel slip value, when determining the clutch torque; and
    determining the actual wheel slip value as a function of the wheel slippage.

5. The method of claim 4, wherein the actual wheel slip value is determined by the wheel slippage of more than one wheel.

6. The method of claim 4, wherein the actual wheel slip value is determined by the wheel slippage of more than one wheel through weighted averaging, differentiation, summation, or ratio calculation.

7. The method of claim 4, wherein the wheel slippage is determined while clutch torque is non-zero and transmitted via the clutch.

8. The method of claim 4, further comprising reducing the clutch torque, when the actual wheel slip value is greater than the default wheel slip value.

9. The method of claim 4, further comprising controlling the actual wheel slip value by adjusting the clutch torque to the default wheel slip value.

10. The method of claim 4, further comprising controlling the actual wheel slip value by adjusting the clutch torque to approach the default wheel slip value.

11. The method of claim 1, wherein the default wheel slip value is an absolute value, a relative value with respect to an initial value, or a differential value.

12. The method of claim 1, wherein the motor vehicle parameter is an actual yaw rate of the motor vehicle, a target yaw rate, a yaw rate differential between the actual yaw rate and the target yaw rate, a roll velocity, an acceleration, a steering angle, or a trailer coupling state.

13. The method of claim 12, wherein the acceleration is a longitudinal acceleration or a transverse acceleration.

14. The method of claim 1, further comprising terminating the starting of the internal combustion engine as a result of at least partly engaging the clutch, when an actual wheel slip value exceeds a maximum wheel slip value that exceeds the default wheel slip value.

15. The method of claim 14, further comprising starting the internal combustion engine by an electric machine, when the starting of the internal combustion engine by partly engaging the clutch is terminated.

16. A drive device for a motor vehicle, comprising:
    an internal combustion engine;
    a clutch operatively connecting the internal combustion engine to at least one wheel, said clutch being configured such that, when the internal combustion engine is inactive during coasting of the motor vehicle and the clutch is disengaged, the internal combustion engine is cranked and thereby started through at least partial engagement of the clutch as a clutch torque is applied to the clutch, with the clutch torque being determined from a default wheel slip value which is based on a motor vehicle parameter; and
    an electric machine configured to start the internal combustion engine.

17. The drive device of claim 16, wherein the default wheel slip value is selected from a plurality of predetermined stored default wheel slip values as a function of the motor vehicle parameter.

18. The drive device of claim 16, wherein the default wheel slip value is determined as a function of the motor vehicle parameter.

19. The drive device of claim 16, wherein the default wheel slip value is an absolute value, an initial value, a relative value, or a differential value.

20. The drive device of claim 16, wherein the motor vehicle parameter is an actual yaw rate of the motor vehicle, a target yaw rate, a yaw rate differential between the actual yaw rate and the target yaw rate, a roll velocity, an acceleration, a steering angle, or a trailer coupling state.

21. The drive device of claim 16, wherein the internal combustion engine is started by the electric machine, when an actual wheel slip value exceeds a maximum wheel slip value that exceeds the default wheel slip value to thereby cause a termination of the starting of the internal combustion engine as a result of the at least partial engagement of the clutch.

* * * * *